United States Patent
Kernohan

[11] 3,881,941
[45] May 6, 1975

[54] ALKALI METAL POLYTUNGSTATE PHOSPHORS CONTAINING EUROPIUM

[75] Inventor: John A. Kernohan, Chesterland, Ohio

[73] Assignee: General Electric Company, Schenectady, N.Y.

[22] Filed: Oct. 1, 1973

[21] Appl. No.: 402,158

[52] U.S. Cl. .............. 106/20; 106/30; 252/301.5; 260/27 R
[51] Int. Cl. ............................ C09d 11/10
[58] Field of Search .................. 106/19–32; 252/301.5, 515; 117/33.5 R, 33.5 C, 33.5 T, 17.5; 423/263, 593

[56] References Cited
UNITED STATES PATENTS

| | | | |
|---|---|---|---|
| 3,174,938 | 3/1965 | Soden et al. | 252/301.5 X |
| 3,262,806 | 7/1966 | Gourgé | 117/17.5 |
| 3,294,701 | 12/1966 | Vogel et al. | 252/301.5 |

OTHER PUBLICATIONS

Heteropolytungstate Complexes of the Lanthanide Elements, The Journal of the Chemical Society, 1971, pp. 1836–1839 and pp. 1937–1940, Parts I & II.

*Primary Examiner*—Theodore Morris
*Attorney, Agent, or Firm*—John F. McDevitt; Lawrence R. Kempton; Frank L. Neuhauser

[57] ABSTRACT

A particular class of alkaline metal polytungstate materials containing europium have been found to be superior in their emission response of converting UV radiation to visible light when compared with conventional phosphors. These phosphors are crystalline solids wherein the europium ion is contained in a particular polytungstate structure and exhibit phosphorescence when excited by a source of 2537A. radiation which makes them especially useful in photodetection systems.

8 Claims, 1 Drawing Figure

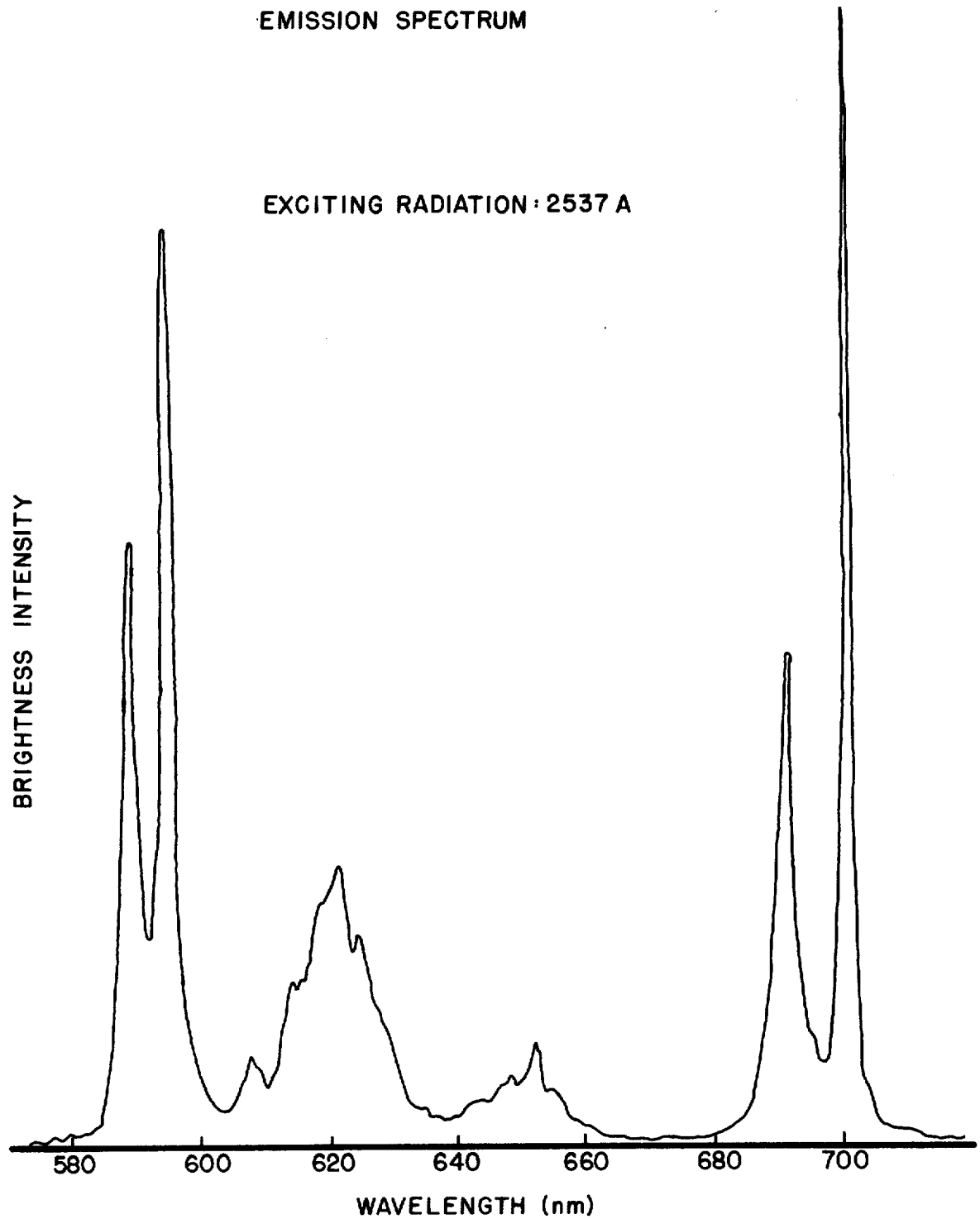

ALKALI METAL POLYTUNGSTATE PHOSPHORS CONTAINING EUROPIUM

BACKGROUND OF THE INVENTION

The present invention relates to a particular class of soluble non-abrasive rare earth polytungstate crystalline solids which exhibit phosphorescence under specific ultraviolet radiation along with the more usual visible emission when excited by broader wavelength ultraviolet radiation. More particularly, the phosphorescence response of the present phosphors under 2537A. radiation is both efficient and rapid while the afterglow is of sufficient time duration to improve methods and systems to be employed for photo detection of the presence of these phosphors.

Alkali metal polytungstate compounds containing the lanthanide elements, including europium, are materials known to exhibit a luminescent response when excited by ultraviolet radiation generally as described in a recent technical article by Peacock and Weakley, entitled "Heteropolytungstate Complexes of the Lanthanide Elements. Part II. Electronic Spectra: A Metal-Ligand Charge-transfer Transition of Cerium (III)", Journal of the Chemical Society (A), 1971, pages 1937–1940. In said article, this general class of luminescent material is reported to exhibit a visible emission response in various colors when excited at 77°K with a 500-watt xenon arc source. In an earlier technical article by the same authors, entitled "Heteropolytungstate Complexes of the Lanthanide Elements. Part I. Preparation and Reactions" appearing at pages 1836–1839 of the Journal of the Chemical Society (A), London, 1971, there is disclosed a material which can be represented by the structural formula $K_7EuW_{10}O_{35} \cdot 18H_2O$ as one of the specific materials exhibiting the aforementioned luminescent response. It is also known to employ phosphors as indicia means upon various objects, including postal mail and packages, to provide a source of information which can thereafter be detected by light sensors when the object is exposed to ultraviolet radiation. The phosphors now being employed respond significantly to ultraviolet radiation of different wavelengths, hence does not permit as specific a means of detecting the information as could be desired. The present phosphors also do not exhibit optimum rise times for this application. A phosphor exhibiting phosphorescent afterglow under 2537A. radiation, but which does not phosphoresce to any significant degree at higher wavelength ultraviolet radiation, such as 3650A. would be desirable.

It is an important object of the invention, therefore, to provide an improved soluble phosphor with specific sensitivity to 2537A. radiation and exhibiting efficient conversion to visible phosphorescence.

A further object of the invention is to provide such phosphors having improved rise time for detection system applications.

A still further object of the present invention is to provide a phosphor exhibiting phosphorescence in the orange-red region to better contrast with the green emitting phosphors now employed in photo detection systems.

SUMMARY OF THE INVENTION

Basically, the present invention comprises use of an alkali metal polytungstate phosphor comprising water-soluble crystals essentially according to the general formula:

$$M_7EuW_{10}O_{35} \cdot xH_2O$$

wherein

M is an alkali metal ion, $x$ is an integer from 0 to about 24, which exhibits phosphorescence when excited by 2537A. radiation but which is relatively insensitive to 3650A. radiation. The above described phosphors are in the form of crystalline solids which can be readily dissolved in various aqueous solutions to provide marking inks with improved capability for photo detection systems. In certain embodiments, the present invention employs a detection system having a source of 2537A. radiation, the above described phosphor, and photo detector means responsive to the orange-red phosphorescence of said phosphor. As herein contemplated, such detection systems could further include a different phosphor which can be excited by different wavelength ultraviolet radiation, but exhibits no significant phosphorescence together with photo detector means responsive to the visible emission of such additional phosphor. Variations of the presently contemplated detection systems could further include a pair of radiation sources as well as a pair of photo detective means, or partial combinations thereof, to enable separate detection of both phosphors when used together as a source of information on various physical objects. Since the structural configuration of already known photo detection systems can be varied widely in accordance with conventional techniques, a more detailed description of this actual equipment need not be repeated in connection with the present invention.

DESCRIPTION OF THE DRAWING

The drawing is a spectral curve depicting the visible emission exhibited by the present phosphors.

DESCRIPTION OF THE PREFERRED EMBODIMENTS

The applicant has discovered that phosphors having the above defined general structural formula exhibit a novel phosphorescence when compared with existing phosphors. While the present phosphors can be generally regarded as stoichiometric compounds having various degrees of hydration in accordance with said structural formula, it is well established that alkali metal polytungstates of this kind possess complex structures making their precise identification difficult by conventional means. Consequently, it should be recognized that small stoichiometric variations in the above general formula, especially with respect to the degree of hydration, are entirely possible without experiencing significant change in the phosphorescent behavior of the material. On the other hand, when the present phosphors are prepared under conditions which lead to significant deviation in the tungstate component of the material as well as variation in the alkali metal or europium content, then it can be expected that the phosphorescent behavior of the modified composition may prove inferior to that obtained with the stoichiometric material.

To prepare the improved phosphors of the present invention exhibiting significant phosphorescence along with an emission spectrum as depicted in accompanying FIG. 1, a preferred method begins with ammonium paratungstate which is boiled in an aqueous sodium hydroxide solution for approximately one hour or more until the ammonia content has been evolved and the sodium salt formed. The pH of said solution is then adjusted with an acid such as acetic acid to a pH value of approximately 7 after which a hot solution of europium salt at a pH 5–6 is then added gradually to the sodium tungstate solution while being maintained at about 95°C. After further heating at said temperature for approximately 5–10 minutes, there has been conversion of said intermediate salt to the europium containing sodium polytungstate phosphor. The resulting solution can be used without further treatment beyond possible cooling and dilution as a phosphorescent marking ink. Alternately, various adhesive binder systems and colorants can be mixed with the phosphor solution to provide adherent coating compositions having more general applicability.

Various types of coating compositions for marking ink purposes are contemplated which can be exemplified by the formulations provided in the following examples. These formulations have been found especially useful for use in automated postal sorting systems wherein the postal stamps or imprints contained upon envelopes, postcards, magazines, packages, etc., and which bear the present marking inks can be identified with a photo detection system of the type above described. By using such identification means, it becomes possible to distinguish any stamps bearing the present marking ink and route the mail automatically after detection of the information therein provided such as: cancellation, local delivery, air mail delivery, etc. In this general manner, the particular photo detection system being employed can operate in a number of different ways depending upon the emission behavior of the incorporated phosphor. More particularly, the mail can be delivered automatically by conveyance means to such photo detection system bearing certain stamps already marked with the present phosphors and wherein a source of 2537A. is located to irradiate the stamps as the mail is being continually passed thereby. Located adjacent to such source of radiation can be photo detector means which are spaced sufficiently apart on the downstream side of the radiation source or otherwise isolated from the radiation being emitted by such source, so as to detect only the phosphors afterglow being emitted from the present phosphors. Luminescent materials can also be employed with such a photo detection system wherein other stamps bear marking inks containing one or more of such luminescent materials to provide additional information which can be detected automatically by modifying the system. More particularly, the same or a different source of ultraviolet radiation which excites the conventional luminescent material can be operated with a different photoconductor means located to detect the visible light being emitted upon said excitation as distinct from the phosphor's afterglow being emitted by the phosphors of the present invention. It is also contemplated that the photo detection systems of the present invention can be further modified to include means for applying phosphor coatings as the physical objects are being conveyed automatically for sorting and wherein such application means are adapted to mark the same stamp for some other location on the same object with a combination of the present phosphors and luminescent materials either sequentially or simultaneously.

In view of the foregoing various possible modifications being contemplated in photo detection systems employing the present phosphors, there can be corresponding variations in the formulation of the coating compositions utilizing these phosphors. In the preferred embodiments, the present phosphors are dissolved in an aqueous solution which can further contain an adhesive binder system in dispersed form. Various colorants can also be dispersed in the marking ink coating to permit visual detection when the coating is applied. Various adhesive binder systems are well-known which can be dispersed to form a mixture with the preferred aqueous solutions containing the present phosphors and still other known components for the marking ink to impart such characteristics to the liquid coating composition as bodying, absence of foam, pH control, and the like have also been found compatible in the liquid coating composition as exemplified in the following specific examples. The use of a water-based marking ink is desirable for the usual considerations. Having the phosphor dissolved in the marking ink helps avoid the abrasion problems now being experienced with conventional phosphors which are simply dispersed in the coating composition as particulate solids. The further efficient emission response of the present phosphors compared with the conventional phosphors permit a marking ink to be employed which contain but 1–5% by weight phosphor in the coating composition. Accordingly, such an ink exhibited comparable emission brightness to inks containing 15–35% weight percent of a conventional calcium silicate phosphor activated with manganese. As an additional desirable characteristic of the present phosphors compared with conventional phosphors, it can be noted from the accompanying FIGURE that the spectral emission is in the form of sharp lines allowing better discrimination by photoconductor means of the phosphor emission.

EXAMPLE 1

A transparent ink utilizing the present phosphors can be formulated in conventional fashion to have a composition as follows:

| Ingredients | Weight (grams) |
|---|---|
| Ethylene Acrylic Acid Copolymer Dispersion | 42.1 |
| Monoethanolamine | 1.8 |
| 50% Maelic Type Rosin Ester In Isopropanol | 12.0 |
| Defoamer | 1.5 |
| Cellosolve Solvent | 17.3 |
| 10% By Weight Aqueous Solution of Sodium Polytungstate Containing Europium | 25.3 |
| | 100.0 |

When excited by 2537A. radiation the above dry coating exhibited a rise time to emission of less than 1 microsecond compared with a rise time of approximately 32 milliseconds for the conventional calcium silicate phosphor above described.

EXAMPLE 2

Comparable results were obtained with a marking ink containing a red pigment having the following formulation:

| Ingredients | Weight (grams) |
|---|---|
| Ethylene Acrylic Acid Copolymer Dispersion | 35.4 |
| Urea | .7 |
| Cellosolve Solvent | 20.9 |
| Defoamer | 1.2 |
| Monoethanolamine | 1 |
| 50% Maelic Type Rosin Ester In Isopropanol | 7 |
| 10% By Weight Aqueous Solution of Sodium Polytungstate Phosphor containing Europium | 22.9 |
| 33% Red Pigment Dispersion | 10.9 |
| | 100.0 |

EXAMPLE 3

A blue marking ink exhibiting comparable emission to that reported in the previous examples can be prepared having the following formulation:

| Ingredients | Weight (grams) |
|---|---|
| Ethylene Acrylic Acid Copolymer Dispersion | 23.4 |
| Monoethanolamine | 1.6 |
| 50% Maelic Type Rosin Ester in Isopropanol | 12.7 |
| Defoamer | .9 |
| Cellosolve Solvent | 31.6 |
| 10% By Weight Aqueous Solution of Sodium Polytungstate Containing Europium | 20.7 |
| 42% Blue Pigment Dispersion | 8.3 |
| Urea | .7 |
| | 100.0 |

It will be apparent from the foregoing description that improved phosphors have been provided exhibiting novel phosphorescent characteristics which are generally useful especially in photo detection applications. Likewise, it should further be appreciated from the foregoing description that the same type photo detection systems could be employed to sort paper money and bank checks using the present phosphors. Dispersion of the present phosphors in other liquid media is also contemplated. It should also be apparent that phosphors of the present invention can be prepared from different starting materials than herein disclosed and that photo detection systems utilizing such phosphors may also employ a different configuration depending upon the particular objectives intended. Consequently, it is intended to limit the present invention only to the scope of the following claims.

What I claim as new and desire to secure by Letters Patent of the United States is:

1. Use of an alkali metal polytungstate phosphor as a photodetection means comprising water-soluble crystals essentially according to the general formula:

$M_7EuW_{10}O_{35} \cdot xH_2O$ wherein

M is an alkali metal ion $x$ is an integer from 0 to about 24 to exhibit phosphorescence when excited by 2537A. radiation characterized by continuous emission in the orange-red region of the visible spectrum, which use comprises exposing an object marked with said phosphor to said excitation radiation.

2. In the use as in claim 1 wherein the alkali metal ion is sodium.

3. In the use as in claim 1 wherein the alkali metal ion is potassium.

4. In the use as in claim 1 wherein X is an integer greater than 1.

5. A phosphorescent marking ink which comprises a liquid dispersion of the phosphor in claim 1.

6. A marking ink as in claim 5 containing approximately 1–5 weight percent phosphor.

7. A marking ink as in claim 5 which also contains an adhesive binder.

8. A marking ink as in claim 7 which also contains a colorant.

* * * * *